United States Patent
Iversen et al.

(10) Patent No.: US 8,652,299 B2
(45) Date of Patent: Feb. 18, 2014

(54) WELDING OF PTFE PARTS

(75) Inventors: Gert Iversen, Helsingør (DK); Agge Tonndorff, Virum (DK); Bo Bøgelund, Valby (DK)

(73) Assignee: Trelleborg Sealing Solutions Helsingor A/S (DK)

( * ) Notice: Subject to any disclaimer, the term of this patent is extended or adjusted under 35 U.S.C. 154(b) by 815 days.

(21) Appl. No.: 12/681,415

(22) PCT Filed: Oct. 3, 2008

(86) PCT No.: PCT/DK2008/050244
§ 371 (c)(1),
(2), (4) Date: Jun. 10, 2010

(87) PCT Pub. No.: WO2009/043357
PCT Pub. Date: Apr. 9, 2009

(65) Prior Publication Data
US 2010/0297404 A1 Nov. 25, 2010

(30) Foreign Application Priority Data
Oct. 3, 2007 (DK) .................................. 2007 01422

(51) Int. Cl.
*B32B 3/02* (2006.01)
(52) U.S. Cl.
USPC ............ 156/701; 156/711; 156/714; 156/247
(58) Field of Classification Search
USPC ........................................................ 156/701
See application file for complete search history.

(56) References Cited

U.S. PATENT DOCUMENTS

| 3,946,136 A | 3/1976 | Fitz et al. |
|---|---|---|
| 4,197,149 A | 4/1980 | Freitag et al. |
| 4,211,594 A | 7/1980 | Freitag et al. |
| 5,762,741 A * | 6/1998 | Kodokian ................ 156/153 |
| 6,228,204 B1 | 5/2001 | Reinhardt et al. |
| 2003/0003290 A1 * | 1/2003 | Hisano et al. ............. 428/308.4 |
| 2007/0044406 A1 * | 3/2007 | Van Aken et al. ............. 52/459 |

FOREIGN PATENT DOCUMENTS

| DE | 198 13 387 A1 | 10/1998 |
|---|---|---|
| DE | 201 07 626 U1 | 8/2001 |
| EP | 0 080 729 A1 | 6/1983 |
| EP | 0 988 141 B1 | 5/2003 |
| WO | WO 2005/095828 A1 | 10/2005 |

OTHER PUBLICATIONS

Klinger News, "Klinger and Kempchen join forces", May 2004, 8 pages.
"Welding technique introduced for assembling very large PTFE gaskets", Sealing Technology, Jul. 2004, 1 page.

* cited by examiner

*Primary Examiner* — Mark Ruthkosky
*Assistant Examiner* — Ian Rummel
(74) *Attorney, Agent, or Firm* — Foley & Lardner LLP

(57) ABSTRACT

During the joining of PTFE parts (10), a binder (20) is applied to the joint surfaces of the PTFE parts, e.g. by welding, before the parts are joined. By establishing a bond between PTFE and binder in a separate, initial process, the parameters of this initial process may be determined regardless of other conditions, such as maintaining the dimensions, and the quality of this bond may be controlled and approved before the subsequent joining of the PTFE parts. During the subsequent joining, the temperature may be kept at a level, which is sufficiently low so as not to deform the PTFE material permanently, or the joining may be carried out by a process, which does not require heating, for example gluing.

11 Claims, 2 Drawing Sheets

WELDING OF PTFE PARTS

The invention relates to a method of joining parts of PTFE (polytetrafluorethylen), wherein the parts are heated to temperatures at which the material is plasticized.

BACKGROUND OF THE INVENTION

PTFE is a material with particular properties, such as low friction, low adhesion to other materials, low surface tension, high resistance to chemicals etc. When PTFE is heated to temperatures at which the joining can be carried out, a substantial increase in volume occurs. Joining of parts of PTFE by means of heating is usually referred to as welding. The parts often have a particular shape and particular tolerances, which are desirable to maintain after welding. In order to obtain a satisfactory welding, the PTFE material must be heated to temperatures close to the melting point, and normally certain precautions are required to avoid permanent deformations, which will have to be machined further to obtain desired dimensions.

DE 23 11 096 describes a method of joining PTFE parts by the addition, during welding, of an intermediate layer of a meltable binder containing perfluoroalkoxypolymer (PFA).

In the industrial configuration, the PTFE parts are generally welded in a straight joint, i.e. the parts' joint surfaces to be welded are positioned directly opposite each other, and heating can be used by means of heating surfaces, which are in contact with the PTFE parts as described in U.S. Pat. No. 4,211,594. In case of rod-shaped parts, the heating surfaces also cover the sides of the parts at some distance from the welding surfaces of the parts, and the heating surfaces assume the form of a closed ring, which fully or partially surrounds the welding zone. Thus, the possibilities of making the parts movable with respect to each other, as described in the patent, are limited. As a result, the heating ring is usually constructed with a certain oversize so that contact is obtained due to thermal expansion, as described in U.S. Pat. No. 4,701,291. Accordingly, the heating ring will also serve as a means of ensuring correct mutual positioning of the parts to be joined.

The binder can for instance be added to the welding surfaces as a separate component in the form of a film, e.g. at the same time as the parts are placed in the welding tool, and binding or welding is obtained by heating to a temperature, which is usually above the melting temperature of PTFE, typically between 330 and 370° C., at the same time as a certain contact pressure, typically between 0.1 and 2 MPa, is exerted. As a result of the change in volume due to the heating and the mechanical influence of the soft, heated PTFE material, undesirable, permanent changes to the dimensions around the welding zone often occur. This constitutes a problem when finished profiles are to be joined, and will usually require further mechanical treatment of the area close to the welding to obtain the desired dimensions.

SUMMARY OF THE INVENTION

In the method according to the invention, a binder is applied to the joining surfaces of the PTFE parts, e.g. by welding, before the parts are joined. After joining the parts the joint is subsequently separated so that complementary joint surfaces are obtained. This makes the subsequent joining process less complicated since the complementary joint surfaces assure self-alignment of the parts to be joined, which is an advantage as the final joining can be carried out at the site of use without the need for an alignment tool. By establishing a bond between PTFE and binder in a separate, initial process, the parameters of this initial process may be determined regardless of other conditions, such as maintaining the dimensions, and the quality of this bond may be controlled and approved before the subsequent joining of the PTFE parts. During the subsequent final joining, the temperature may be kept at a level, which is sufficiently low to avoid permanent deformation of the PTFE material, or the joining may be carried out by a process, which does not require heating, for example gluing.

DETAILED DESCRIPTION OF THE INVENTION

In the following, an embodiment of the invention, in which two opposite ends of a rod-shaped piece of a PTFE material are joined to form a ring, e.g. a sealing to be mounted by means of joining in place on machinery where an already existing sealing is to be replaced.

Figure 1:
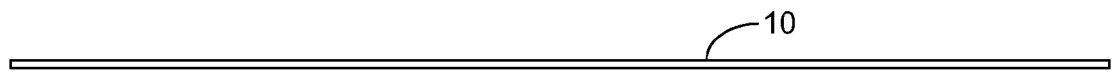
FIG. 1 illustrates an example of an elongated part of a PTFE-based material.

FIG. 1 illustrates a rod-shaped piece 10 of a PTFE material having a length corresponding to the desired circumference of the final sealing. This piece may have a cross section, which is the final one of the finished sealing, or it can be in the form of a rod-shaped semi-manufacture with a non-final cross section.

Figure 2:
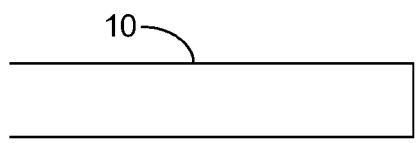
FIGS. 2-4 illustrate schematic steps of applying a binder to an end surface of a part of a PTFE-based material.

FIG. 2 illustrates an end piece of the rod-shaped piece 10 of PTFE material according to FIG. 1 with a free end to be prepared for subsequent joining by means of welding.

Figure 3:
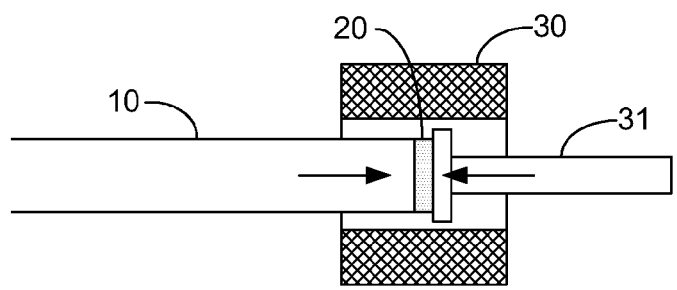

FIG. 3 illustrates a layer of a binder 20 applied to the free end of the rod-shaped piece 10 positioned in a heating element 30, which surrounds the end piece 10 in an area around the end. By means of a push rod 31 with an appropriately shaped end surface, an appropriate pressure is exerted on the binder 20. The push rod may have a plane abutment surface for the binder, or it may have a profiled surface. Accordingly, two end surfaces for subsequent joining can be given complementary profiles, so that they mate in one specific way and are consequently self-aligning.

Figure 4:
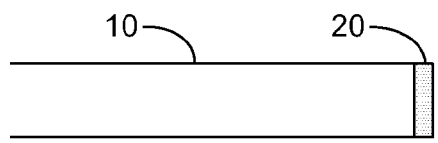

FIG. 4 illustrates the rod-shaped piece 10 after the application of the binder 20 and cooling of the part.

Figure 5:
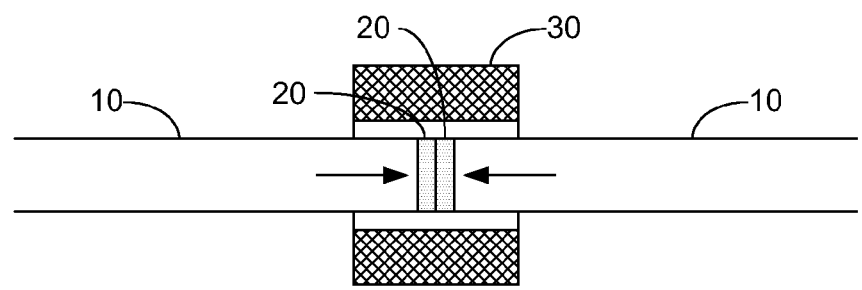
FIG. 5 illustrates schematically the process of joining the ends of two separate parts, according to FIG. 4, to form a ring, or of two ends of a part according to FIG. 1.

FIG. 5 illustrates the way in which the two end pieces 10 with binder 20, e.g. PFA-based material on the end surfaces, are joined in a welding process, including the application of heat by means of a heating element 30 surrounding the end pieces 10 in a zone around the joint. The welding temperature can be selected mainly on the basis of the properties of the binder and, to a lesser extent, on the basis on the melting temperature of PTFE. This is an advantage, since a binder with a lower melting temperature than the melting temperature of PTFE can be used, so that a lower temperature can be used during welding, whereby the changes in dimension as a result of heating are reduced or completely avoided, just as the chance of obtaining the desired strength and uniformity of the joint is also greater.

Figure 6:
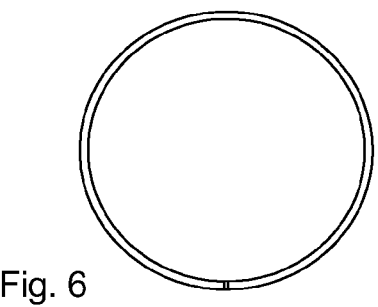
FIG. 6 illustrates the part according to FIG. 1, the ends thereof being joined as shown in FIG. 5 to form a ring, e.g. a sealing ring.

FIG. 6 illustrates a ring formed from the rod-shaped part of FIG. 1 by the above-mentioned process steps, which is also illustrated in FIGS. 2-5.

In a preferred embodiment the open sealing, or the desired piece of the sealing, is welded to a closed ring. This is effected by use of a suitable binder, such as PFA, and by means of the method steps and process parameters as described above. After the joining, the heat-affected area is de-stressed by heating and cooling in accordance with a predetermined temperature cycle, after which the sealing is processed further to a correct cross section. Finally, the sealing is split or opened at the welding, which—when PFA is used as binder—can be performed by heating to a temperature between 290 and 320° C., optionally combined with a weak mechanical influence. The thus prepared sealing can later be joined as described above by heating to temperatures below the melting temperature of PTFE.

In a further preferred embodiment, a PTFE profile is welded together to form a closed ring, using a suitable binder such as PFA and by means of the method steps and process parameters as described above. The joint surfaces may be plane, or they may be profiled with complementary profiles, whereby the areas of the welding surfaces are increased and a particular mutual positioning and self-alignment of the joint surfaces is ensured. After the joining, the heat-affected area is de-stressed by heating in accordance with a predetermined temperature course. The desired sealing is then prepared by normal processing from the thus obtained crude part.

Finally, the sealing is separated at the welding, which—when PFA is used as binder—can be performed by heating to a temperature between 290 and 320° C., optionally combined with a weak mechanical influence. The thus prepared sealing can later be joined as described above by heating to temperatures below the melting temperature of PTFE.

Figure 7:
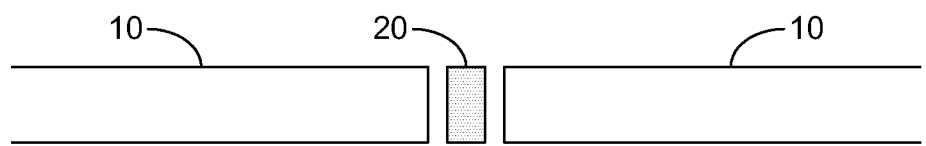
FIGS. 7-9 illustrate schematically an alternative method of preparing two ends of a PTFE-based material for joining by means of welding.
Figure 8:
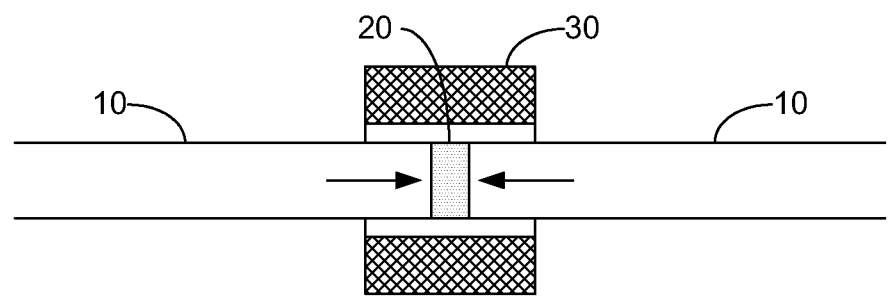
Figure 9:
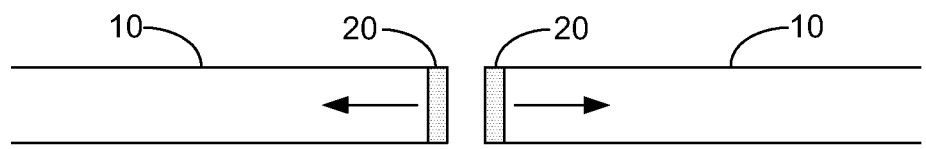

FIGS. 7-9 illustrate this method of preparing joint surfaces of PTFE-based materials. The two end pieces 10 can be separate parts, or they may be the ends of a rod-shaped part according to FIG. 1. The following is based on an existing annular sealing. Firstly, the ring-shaped sealing (not shown) is cut through, or a rod-shaped piece is cut out with a length corresponding to the desired perimeter of the final sealing. After this, a suitable binder 20 is applied by welding, or by moulding as shown in FIGS. 7-8, such that the binder is in fixed connection with the end surfaces of the PTFE parts.

When the ends have been welded together and cooled, it may be convenient to process the welding so that it achieves the correct dimensions. The joint is then separated by cutting the binder 20 e.g. using a cutting blade or a laser, whereby a pair of prepared joint surfaces is obtained with binder on both surfaces. Advantageously, a profiled cutter may be used, so that the resulting end surfaces are complementary. When thus prepared, the complementary end surfaces are to be joined as shown in FIG. 5, they are self-aligning and only mate in one specific position. This reduces the risk of lateral shifts around the joining site.

It is possible to use a binder 20 based on PTFE, including modified PTFE with a content of fillers, making the binder suitable both for welding and joining by means of gluing. PFA can be mentioned as an example of the first group of fillers, whereas a high content of carbon fibres, metals and minerals may provide a satisfactory strength in connection with gluing.

Binding or welding may be effected solely by means of the binder left on the joint surfaces in the first process, or by addition of new binder, optionally with a different composition and different properties. The new binder may be the same material as the first binder, but may also be different materials, which are able to bind to this. In case the first binder is PFA, the second binder may be suitable fluor-containing polymers with lower melting temperatures, such as FEP or ETFE. In case the first binder is PTFE with a high content of fillers, which is suitable for gluing, the second binder may be a glue type, such as epoxy or cyanoacrylate. Furthermore, parameters for binding or welding of the PTFE parts, such as temperature and contact force, may be determined with respect to maintaining dimensions, so that changes in dimensions and further processing are reduced and optionally omitted. This is particularly advantageous in connection with joining of sealings in PTFE-based materials and other parts with special requirements regarding dimensions and surface finish.

Additionally, the invention may be used in cases, where maintenance is desired in connection with new annular sealings of PTFE on existing machinery, which would otherwise require time-consuming and/or costly separation and disengagement of the equipment. For example, this may occur in large hydraulic cylinders, in process equipment, or in connection with oil and gas recovery.

Depending on possible deformations caused by heating, the heat-affected areas may subsequently be de-stressed by controlled heating and cooling with respect to a predetermined temperature cycle. Finally, the sealing is processed to have a correct cross section, and the joint surfaces may be processed further to have a specific binder layer thickness. The thus prepared sealing can later be joined as described above by heating to temperatures below the melting temperature of PTFE.

The invention claimed is:

1. A method of preparing a pair of joint surfaces at opposed ends of a rod-shaped piece of a PTFE-based material, the method comprising
   joining the opposed ends to form a ring,
   welding the pair of joint surfaces together with an intermediate layer of a binder to obtain a joint,
   cutting the binder with a cutting blade or laser to thereby separate the joint,
   obtaining complementary joint surfaces of the separated joint, and
   configuring the complementary end surfaces to self-align and mate in a specific position.

2. A method according to claim 1, wherein the binder contains perfluoroalkoxypolymer.

3. A method according to claim 1, wherein the binder is based on PTFE with fillers, making the binder suitable for welding or gluing.

4. A method according to claim 1 further comprising, prior to separation, processing the joint to desired dimensions.

5. A method according to claim 1 further comprising, during separation, giving the joint surfaces complementary profiles.

6. A method of joining opposed ends of a rod-shaped piece of PTFE-based materials, comprising
   preparing the joint surface on each of the parts by a method according to claim 1, and
   joining the prepared surfaces by means of binding or welding to form a ring.

7. A method according to claim 6, further comprising
   adding a binder other than perfluoroalkoxypolymer;
   heating to a maximum temperature between 150 and 400° C.; and
   subsequent cooling.

8. A method according to claim 6, further comprising
adding a binder other than perfluoroalkoxypolymer;
heating to a maximum temperature between 150 and 300° C.; and
subsequent cooling.

9. A method according to claim 6, further comprising
heating to a maximum temperature between 280 and 380° C., and
subsequent cooling.

10. A method according to claim 9, further comprising
adding perfluoroalkoxypolymer as a binder,
heating to a maximum temperature between 280 and 380° C., and
subsequent cooling.

11. A method according to claim 9, further comprising
joining by heating to a maximum temperature between 280 and 325° C., and
subsequent cooling.

\* \* \* \* \*